United States Patent [19]

Kurian

[11] Patent Number: 5,762,556
[45] Date of Patent: Jun. 9, 1998

[54] ADJUSTABLE FREE MOTION CLUTCH

[75] Inventor: Bradley S. Kurian, Perkiomenville, Pa.

[73] Assignee: Neapco Inc., Pottstown, Pa.

[21] Appl. No.: 806,481

[22] Filed: Feb. 27, 1997

[51] Int. Cl.⁶ .................................................. F16D 7/02
[52] U.S. Cl. ...................................... 464/46; 464/160
[58] Field of Search ............................. 464/30, 45, 46, 464/47, 48, 160

[56] References Cited

U.S. PATENT DOCUMENTS

| | | | |
|---|---|---|---|
| 1,282,786 | 10/1918 | Entz | 464/160 |
| 2,055,803 | 9/1936 | Rafter | 464/48 X |
| 2,348,071 | 5/1944 | Johnstone | 464/160 X |
| 2,910,842 | 11/1959 | Sensenig. | |
| 3,122,903 | 3/1964 | Ramsden | 464/48 |
| 3,376,714 | 4/1968 | Manoni | 464/46 |
| 3,605,443 | 9/1971 | Redelman | 464/46 |
| 4,464,137 | 8/1984 | Jennings | 464/48 |
| 4,560,364 | 12/1985 | Cohen | 464/160 X |
| 4,752,276 | 6/1988 | Fukumoto | 464/160 |
| 4,947,972 | 8/1990 | Lea | 464/48 X |
| 5,149,223 | 9/1992 | Watts. | |
| 5,415,256 | 5/1995 | Weigand et al. | 464/30 X |
| 5,681,222 | 10/1997 | Hansen | 464/160 |

FOREIGN PATENT DOCUMENTS 1251174  12/1960  France ................................ 464/48

Primary Examiner—Randolph A. Reese
Assistant Examiner—Eileen A. Dunn
Attorney, Agent, or Firm—Woodcock Washburn Kurtz Mackiewicz & Norris LLP

[57] ABSTRACT

An adjustable free motion friction clutch assembly having an input end and an output end. The input end includes a splined drive hub for receiving therein a splined power shaft and the drive hub is freely rotatable through a predetermined angle relative to the output end for alignment with the splined power shaft.

6 Claims, 3 Drawing Sheets

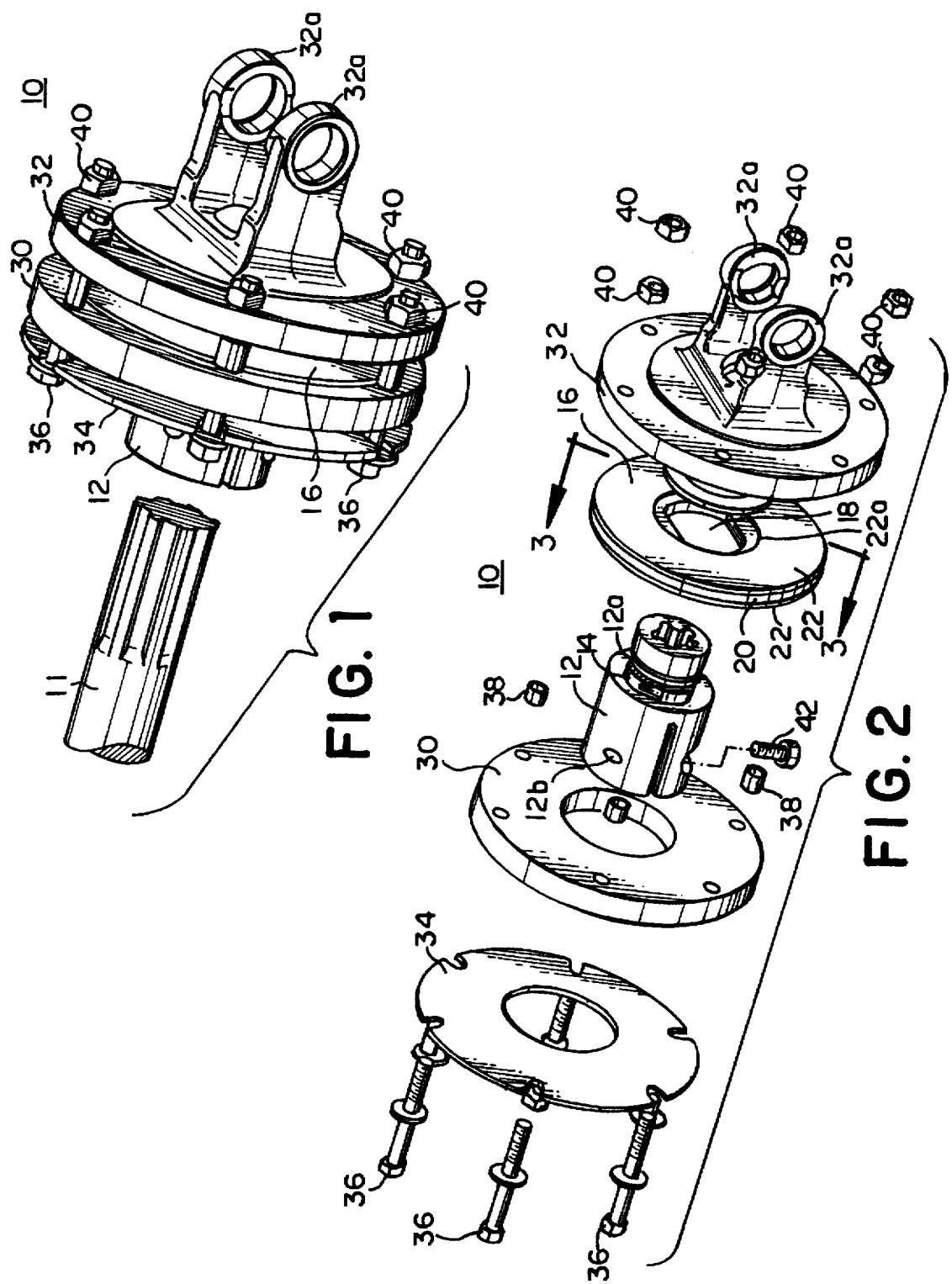

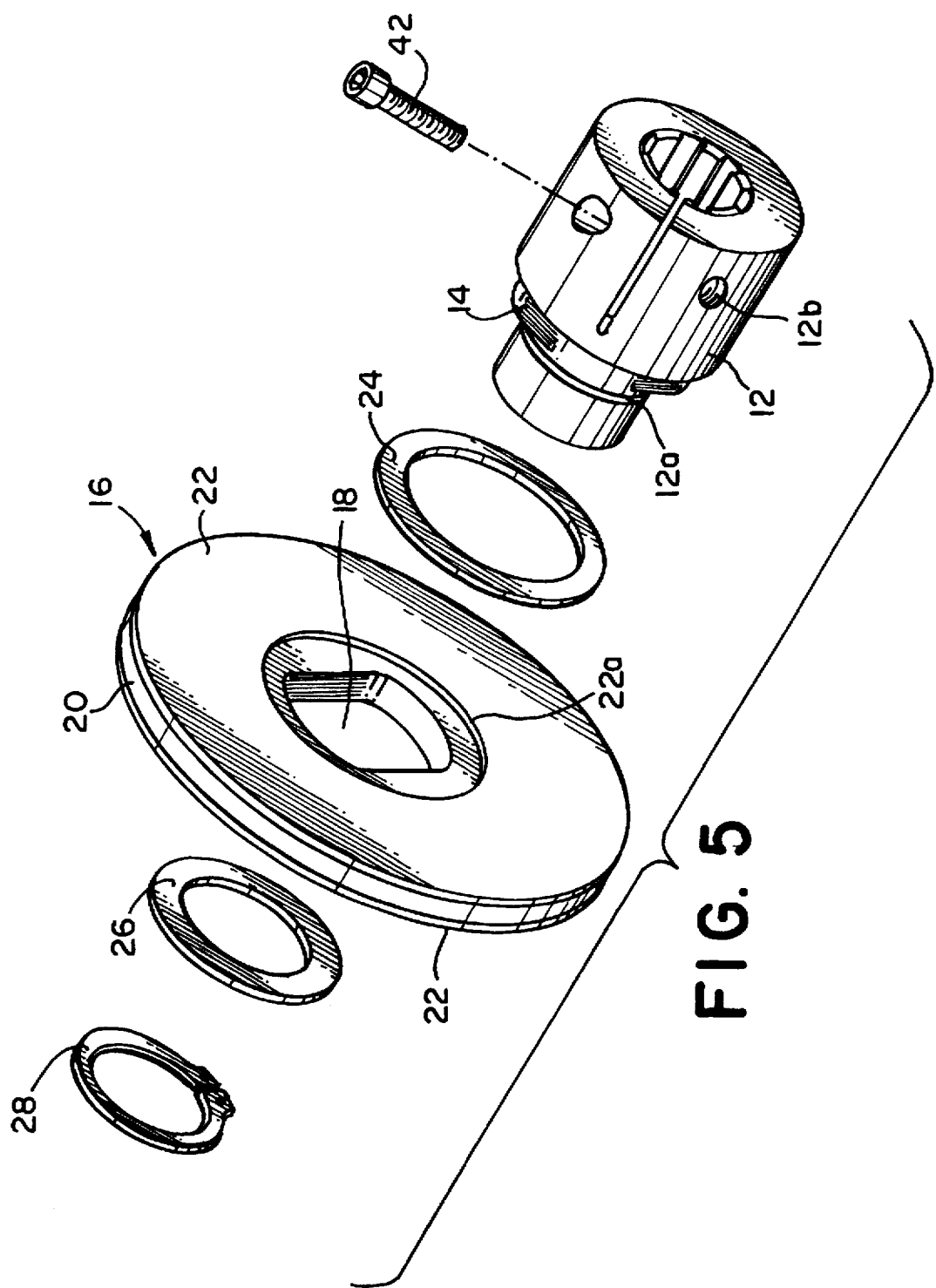

5,762,556

1

ADJUSTABLE FREE MOTION CLUTCH

BACKGROUND OF THE INVENTION

The present invention relates generally to a clutch for transmitting torque between an input and an output and more particularly to a clutch having limited free motion of the input end relative to the output end thereof.

In the agricultural industry it is common practice to utilize drivelines to operate various types of farm machinery. For example, drivelines are used as a power shaft in a round hay baler. Balers are towed behind a tractor to collect and roll hay into round bales utilizing power supplied by the tractors rear power take off unit. This power shaft is the power connection between the tractor and the baler. It is common practice to use a friction clutch between the power shaft and the baler. It would be desirable to provide a clutch mechanism with a limited degree of free motion so that the input end of the clutch can be rotated through a predetermined angle relative to the output end. The purpose of the free motion is to allow an operator to rotate the input end of the clutch, and line up the splines of the two mating shafts with minimal effort.

SUMMARY OF THE INVENTION

It is accordingly an object of the present invention to provide an adjustable free motion friction clutch assembly where the input end can be freely rotated through a predetermined angle relative to the output end to allow an operator to rotate the input end of the clutch and line up the spline thereof with the spline of a power shaft.

Accordingly in accordance with one aspect of the invention there is provided an adjustable free motion friction clutch assembly having an input end and an output end, the input end being rotatable through a predetermined angle relative to the output end for alignment with a splined power shaft. The input end comprises a splined drive hub for receiving therein the splined power shaft. The splined hub has on the outer circumference thereof cam means of predetermined configuration. A friction disk means having a central aperture therethrough is mounted on the cam means of the splined hub. The aperture in the friction disk means cooperates with the cam means on the hub to permit rotation of the hub through a predetermined angle relative to the disk means. Means is provided for mounting the friction disk means on the splined hub. The output end of the clutch assembly comprises a pair of clutch plates mounted on opposite sides of the friction disk means. Means is also provided for biasing the clutch plates against the friction disk means whereby power from the splined power shaft is supplied to the splined hub at the input end of the clutch and through the friction disk means to the clutch plates at the output end of the clutch.

In accordance with another aspect of the invention, the configuration of the cam means on the outer circumference of the splined hub comprises a first pair of arcuate surfaces located at a first radius on opposite side of the axis of the cam means. A second pair of arcuate surfaces is located at a second radius on opposite sides of the axis intermediate the first pair of arcuate surfaces. The second radius is smaller than the first radius and two pairs of flat surfaces connect the ends of the pairs of arcuate surfaces. The included angle along the first pair of arcuate surfaces and between the adjacent flat surfaces is equal to the predetermined angle through which the input end of the clutch is rotatable relative to the output end. The central aperture through the friction disk means for receiving the cam means on the hub comprises a third pair of arcuate surfaces having a radius corresponding to the radius of the first pair of arcuate surfaces on the cam means of the splined hub. The third pair of arcuate surfaces is located on the opposite sides of the axis and the ends thereof being joined by a third pair of flat surfaces, the third pair of flat surfaces being parallel and providing stops for engaging the flat surfaces on the cam means on the spline hub to limit the rotation of the hub relative to the friction disk means to the predetermine angle.

BRIEF DESCRIPTION OF THE DRAWINGS

FIG. 1 is a perspective view of a drive shaft associated with a free motion friction clutch assembly embodying the present invention.

FIG. 2 is an exploded view of the free motion clutch assembly shown in FIG. 1.

FIG. 5 is an exploded view illustrating the subassembly of the friction disk and the splined drive hub.

DESCRIPTION OF THE PREFERRED EMBODIMENT

Figure 3:
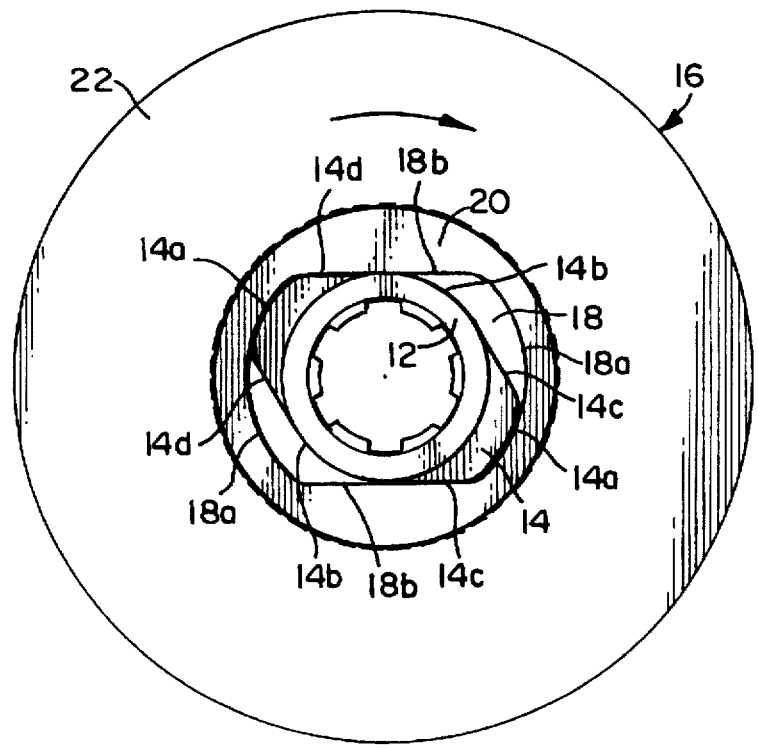
FIG. 3 is a view of the splined drive hub and friction disk of FIG. 2 with the drive hub located in a stop position at one end of the predetermined angle of rotation.

Referring to FIGS. 1 and 2 there is illustrated an adjustable free motion friction clutch assembly 10 having an input end and an output end with the input end being rotatable through a predetermined angle relative to the output end for alignment with a splined power shaft 11. The input end comprises a splined drive hub 12 for receiving therein the splined power shaft 11. The splined drive hub 12 has on the outer circumference thereof and intermediate its ends a cam 14 of predetermined configuration as later to be described. A friction disk 16 having a central aperture 18 therethrough is mounted on the cam 14 of the splined hub 12. The aperture 18 cooperates with the cam 14 on the hub 12 to permit rotation of the hub 12 through a predetermined angle relative to the disk 16.

The friction disk 16 includes a metal plate core 20 having annular friction material 22 bonded to the opposite sides thereof, FIG. 2. The friction material 22 has central openings 22a therethrough of a diameter greater than the aperture 18 through the friction disk 16. As shown in FIG. 5 a first washer 24 has an opening therethrough dimensioned to be received on the cam 14 on the splined hub 12. The washer 24 has an outside diameter dimensioned to be received within the opening in the annular friction material bonded to the side of the metal plate core 20 adjacent the input end of the clutch. A second washer 26 has an outside diameter dimensioned to be received within the opening (not shown) in the other annular friction material 22 bonded to the other side of the metal plate core 20. The second washer 26 has an opening therethrough dimensioned to be received on the splined hub 12. The friction disk 16 is mounted on the splined hub 12 by a lock ring 28 to be received in a groove 12a on hub 12 for locking the first washer 22 and the friction disk 16 and the second washer 24 against the shoulder intermediate to the ends of on the splined hub 12.

The output end of the friction clutch assembly includes a pair of clutch plates 30 and 32 mounted on opposite sides of the friction disk 16. As may be seen in FIGS. 1 and 2 the clutch plate 32 is in the form of a flange yoke with yoke portions 32a adapted to be connected to the machinery to be driven from the power input shaft 11.

As shown in FIGS. 1 and 2 there is provided a spring member 34 having a central opening therethrough for receiving the input end of the splined hub 12. The spring 34 preferably is of the type well known in the art as a Belleville spring. A plurality of bolts 36 are inserted through peripheral openings in the spring member 34 and through openings around the periphery of clutch plate 30 and through tubular guides 38 and openings in the flange yoke 32. Nuts 40 are secured to the threaded ends of the bolts 36 to sandwich the friction disk 16 between the opposed faces of the clutch plate 30 and the flange yoke 32 and apply a biasing pressure against the friction disk 16 by way of the spring member 34.

Figure 4:
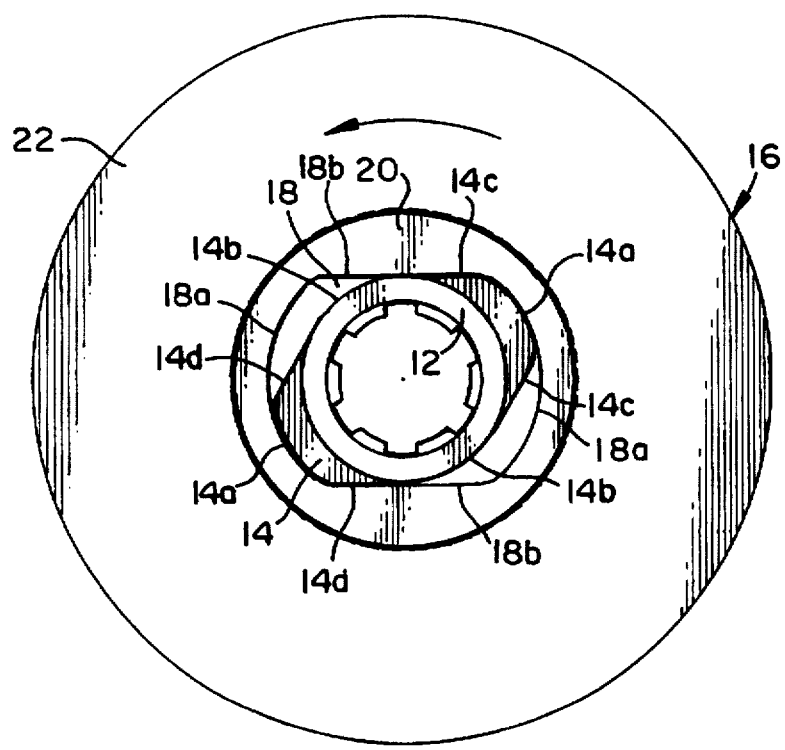
FIG. 4 is a view similar to FIG. 3 with the splined drive hub shown at the other stop position of the predetermined angle of rotation relative to the friction disk.

Referring now to FIGS. 3 and 4, it will be seen that the cam 14 on the outer circumference of the splined hub 12 has a first pair of arcuate surfaces 14a, 14a located at a first radius on opposite sides of the axis of the cam 14. A second pair of arcuate surfaces 14b, 14b are located at a second radius on opposite sides of the axis intermediate the first pair of arcuate surfaces 14a, 14a. The second radius is smaller than the first radius. Two pairs of flat surfaces 14c, 14c and 14d, 14d connect the ends of the pairs of arcuate surfaces 14a, 14a and 14b, 14b. The included angle along the first pair of arcuate surfaces 14a, 14a and between the adjacent flat surfaces 14c, 14c or 14d, 14d is equal to the predetermined angle through which the input end of the clutch is rotatable relative to the output end. The central aperture 18 through the friction disk 16 for receiving the cam 14 on the hub 12 includes a third pair of arcuate surfaces 18a, 18a having a radius corresponding to the radius of the first pair of arcuate surfaces 14a, 14a on the cam 14 of the splined hub 12. The third pair of arcuate surfaces 18a, 18a are located on opposite sides of the axis of the cam 14 and the ends thereof are joined by a third pair of flat surfaces 18b, 18b which are parallel to each other and provide stop structure for engaging the flat surfaces 14c and 14d on the cam 14 on the spline hub 12 to limit rotation of the hub relative to the friction disk 16 to the predetermined angle. As may be seen in FIG. 3 the hub 12 has been rotated to one limit of its free rotation in the clockwise direction as indicated by the arrow. In FIG. 4 the hub 22 has been rotated to the other limit of free rotation in the counter clockwise direction as indicated by the arrow. The predetermined angle of free rotation for the hub 12 may vary but as illustrated in FIGS. 3 and 4 is about 60°. By enabling the splined drive hub 12 at the input end of the friction clutch assembly 10 to be rotated through a predetermined angle, such for example as 60° this enables the operator to line up the splines on the hub 12 with the splines on the drive shaft 11 for assembly therewith. It will be noted in FIGS. 2 and 5 that the drive hub 12 is of split construction with a pair of cap screws 42 (one shown) adapted to be inserted in threaded openings 12b on opposite sides of the axis of the hub 12. After the hub 12 has been assembled on the spline of the power shaft 11, the cap screws 42 are tightened to pull the split portions of the hub together and thus tighten the hub 12 on the spline of the drive shaft 11.

While there has been described a preferred embodiment of the invention, it will be understood that further modifications may be made without departing from the spirit and scope of the invention as set forth in the appended claims.

What is claimed is:

1. An adjustable free motion friction clutch assembly having an input end and an output end, said input end being rotatable through a predetermined angle relative to said output end for alignment with a splined power shaft, said input end comprising a splined drive hub for receiving therein the splined power shaft, said splined hub having on the outer circumference thereof cam means of predetermined configuration, friction disk means having a central aperture therethrough mounted on said cam means of said splined hub for rotation therebetween, said aperture cooperating with said cam means on said hub to permit rotation of said hub through a predetermined angle relative to said disk means, means for mounting said friction disk means on said splined hub, said output end comprises a pair of clutch plates mounted on opposite sides of said friction disk means, and means for biasing said clutch plates against said friction disk means whereby power from the splined power shaft is supplied to the splined hub at the input end of the clutch and through the friction disk means to the clutch plates at the output end of said clutch.

2. An adjustable free motion friction clutch assembly according to claim 1 wherein said friction disk means comprises a metal plate core having annular friction material bonded to the opposite sides thereof, said friction material having central openings therethrough of a diameter greater than the aperture through said friction disk means, a first washer having an opening therethrough dimensioned to be received on said cam means on said splined hub, said first washer having an outside diameter dimensioned to be received within the opening in the annular friction material bonded to the side of said metal plate core adjacent the input end of said clutch, a second washer having an outside diameter dimensioned to be received within the opening in the other annular friction material bonded to the other side of said metal plate core, said second washer having an opening therethrough dimensioned to be received on said splined hub, and wherein said means for mounting said friction disk means on said splined hub includes a lock ring for locking said first washer said friction disk means and said second washer on said splined hub.

3. An adjustable free motion clutch assembly according to claim 1 wherein said means for biasing said clutch plates against said friction disk means comprises a spring member having a central opening therethrough for receiving the input end of said splined hub and means for securing together said spring member and said pair of clutch plates.

4. An adjustable free motion clutch assembly according to claim 1 wherein said clutch plate at the output end of said clutch comprises a flange yoke.

5. An adjustable free motion friction clutch assembly according to claim 1 wherein said configuration of said cam means on the outer circumference of said splined hub comprises a first pair of arcuate surfaces located at a first radius on opposite sides of the axis of said cam means, a second pair of arcuate surfaces located at a second radius on opposite sides of the axis intermediate said first pair of arcuate surfaces, said second radius being smaller than said first radius, and two pairs of flat surfaces connecting the ends of said pairs of arcuate surfaces, the included angle along said first pair of arcuate surfaces and between the adjacent flat surfaces being equal to said predetermined angle through which said input end of said clutch is rotatable relative to said output end, and wherein said central aperture through said friction disk means for receiving said cam means on said hub comprises a third pair of arcuate surfaces having a radius corresponding to the radius of said first pair of arcuate surfaces on said cam means of said splined hub, said third pair of arcuate surfaces being located on opposite sides of the axis and the ends thereof being joined by a third pair of flat surfaces, said third pair of flat surfaces being parallel and providing stop structure for engaging the flat surfaces on said cam means on said splined hub to limit the rotation of said hub relative to said friction disk means to said predetermined angle.

6. An adjustable free motion friction clutch assembly according to claim 5 wherein said predetermined angle is about 60°.

* * * * *